United States Patent Office 2,852,376
Patented Sept. 16, 1958

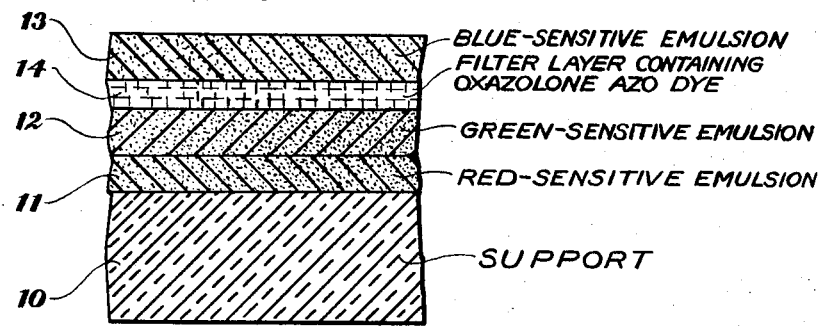
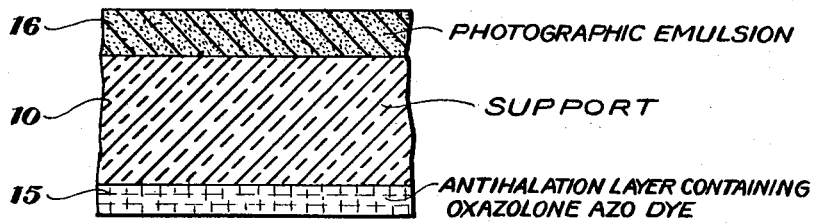

2,852,376
INTEGRAL FILTER FOR COLOR PHOTOGRAPHY

George W. Sawdey, Rochester, N. Y., assignor to Eastman Kodak Company, Rochester, N. Y., a corporation of New Jersey Application March 9, 1955, Serial No. 493,124

12 Claims. (Cl. 96—69)

The present invention relates to improved photographic elements, and more particularly, to photographic elements having light-screening substances therein.

It is known that photographic elements require, for many purposes, light-screening substances incorporated therein. Such a light-screening substance can be in a layer overlying a light-sensitive emulsion or two or more such light-sensitive emulsions, or it can be incorporated in the light-sensitive emulsion layer itself for the purpose of modifying a light record in such emulsion, or protecting an underlying light-sensitive emulsion or emulsions from the action of light of wave-length absorbed by such light-screening substances. Alternatively, such light-screening substances can be in a layer not containing a light-sensitive substance, but arranged between two light-sensitive emulsions, or such light-screening substances can be in a layer serving as a backing on an element having one or more light-sensitive emulsions for the purpose of reducing halation.

More particularly, such light-screening substances are required in layers arranged between differentially-colored sensitized emulsions, e. g., to protect the red and green sensitized emulsions from the action of blue light, or in backings forming the so-called anti-halation layers on either side of a transparent support carrying the light-sensitive emulsion or emulsions.

In most cases, and particularly where the photographic element contains differentially-colored sensitized emulsions (or color-sensitized emulsions), it is desirable to employ light-screening substances which do not affect the general sensitivity or the color sensitivity of the light-sensitive emulsions with which they may come into contact, and in addition to have the desirable property of easy removal from the photographic element after or during development of the exposed photographic element.

Such light-screening substances which do not undergo substantial diffusion from the layers or coatings in which they are incorporated, either during the manufacture of the photographic element or on keeping it in a photographic processing solution, are especially useful.

In general, such light-screening substances should be easily removed or made ineffective by one of the processing solutions customarily employed in photographic treatments, e. g., a photographic developing bath, fixing bath, or a silver-oxidizing (including silver-removing) bath. Such removal or rendering ineffective is particularly important when making color photographs using several differentially color-sensitized emulsions containing the usual silver halide salts. Such differentially color-sensitized emulsions must be processed to different colors and to facilitate differential color-processing, methods involving selective exposure of light-sensitive images in the layers can be employed. Such selective re-exposure, e. g., of silver halide remaining undeveloped in development of the latent images formed in silver halide emulsion layers is often facilitated, if the light-screening substance which was present during the original exposure is decolorized or removed during treatment in one of the processing baths, and more particularly, during development. Any of the elements referred to above can be such that one or more of the light-sensitive layers contain coupling components, such as those described in U. S. Patent 2,306,410, granted August 16, 1938.

The instant invention relates to the use of a new type of light-screening dye which is easily removed during the photographic processing customarily employed. The dyes of my invention form stable filter coatings and cause little or no desensitizing in photographic emulsions with which they come in contact.

Accordingly, it is an object of my invention to provide new photographic elements. A further object of my invention is to provide photographic elements differentially-sensitized for use in photographic color processes and containing a particular type of light-screening substance. Still another object of my invention is to provide new light-screening dyes and a method for making them. Other objects will become apparent from a consideration of the following description and examples.

The light-screening dyes which I advantageously employ in practicing my invention can be represented by the following general formula:

I
$$R-N=N-C-N$$
$$HO-C\quad C-R_1$$
$$\diagdown O \diagup$$

wherein R and $R_1$ each represents an aryl group, such as phenyl, tolyl, carboxyphenyl, sulfophenyl, methoxyphenyl, ethoxyphenyl, alkylsulfamylphenyl (e. g., methylsulfamylphenyl, ethylsulfamylphenyl, tetradecylsulfamylphenyl, etc.), etc. (e. g., a monocyclic aryl group of the benzene series).

Alternatively, the dyes represented by Formula I above can be written in their meso-ionic structure as follows:

Ia
$$R-N=N-\overset{H}{\underset{|}{C}}-N$$
$$O=C\quad C-R_1$$
$$\diagdown O \diagup$$

wherein R and $R_1$ each have the values given above.

In the accompanying drawing, the figures are enlarged sectional views of photographic elements illustrative of my invention showing filter or anti-halation layers in representative elements.

Among the dyes selected from those represented by Formulas I (or Ia) which can be used in practicing my invention are those represented by the following formulas:

(1)
$$C_6H_5-N=N-C-N$$
$$HO-C\quad C-C_6H_5$$
$$\diagdown O \diagup$$

5-hydroxy-4-phenylazo-2-phenyloxazole (2)
4-(3-carboxyphenylazo)-5-hydroxy-2-phenyloxazole (3)
4-(4-n-dodecyloxy-2-sulfophenylazo)-5-hydroxy-2-phenyloxazole sodium salt (4)
4-(3-carboxyphenylazo)-2-(2-carboxyphenyl)-5-hydroxyoxazole (5)

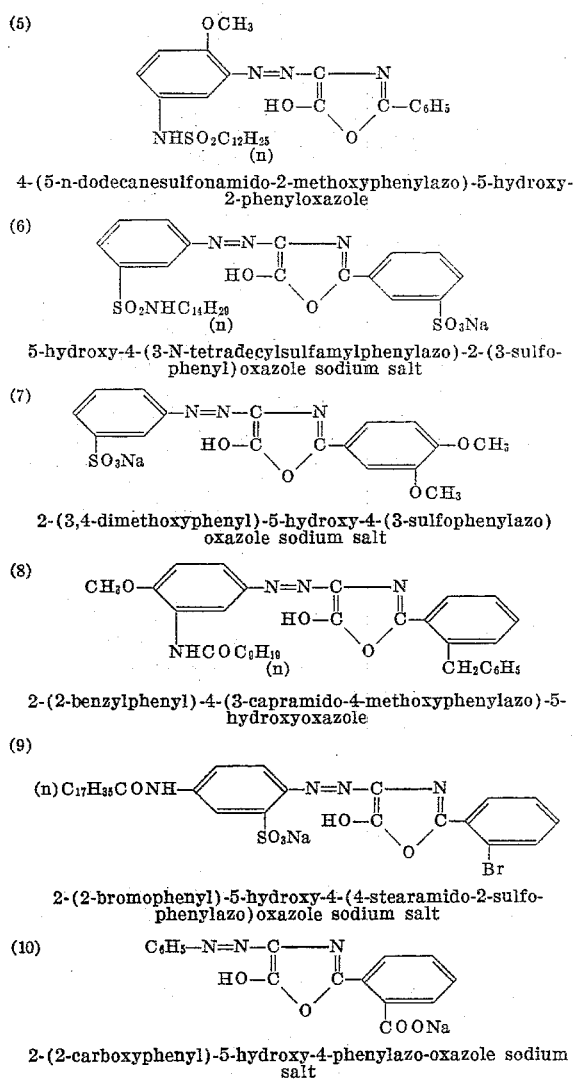

4-(5-n-dodecanesulfonamido-2-methoxyphenylazo)-5-hydroxy-2-phenyloxazole (6)

5-hydroxy-4-(3-N-tetradecylsulfamylphenylazo)-2-(3-sulfophenyl)oxazole sodium salt (7)

2-(3,4-dimethoxyphenyl)-5-hydroxy-4-(3-sulfophenylazo)oxazole sodium salt (8)

2-(2-benzylphenyl)-4-(3-capramido-4-methoxyphenylazo)-5-hydroxyoxazole (9)

2-(2-bromophenyl)-5-hydroxy-4-(4-stearamido-2-sulfophenylazo)oxazole sodium salt (10)

2-(2-carboxyphenyl)-5-hydroxy-4-phenylazo-oxazole sodium salt

The dyes selected from those represented by Formula I above (or Ia) can be prepared by intermixing a compound selected from those represented by the following general formula:

II

wherein $R_1$ has the values given above, with a compound selected from those represented by the following general formula:

III

wherein R has the values given above. While the mixture can be heated somewhat to facilitate the desired reaction, it is generally not necessary to do so, and room temperatures, or temperatures below room temperature, can advantageously be employed.

The intermediates selected from those represented by Formula II can advantageously be prepared by heating together a compound selected from those represented by the following general formula:

IV

wherein $R_1$ has the values given above, with acetic anhydride. Temperatures from about 70 to 100° C. can advantageously be employed. Representative of the acids of Formula IV which can be employed in practicing my invention are hippuric acid, 2-bromohippuric acid, 2-carboxyhippuric acid, 2-benzylhippuric acid, 3,4-dimethoxyhippuric acid, 3-sulfohippuric acid, etc.

The diazonium salts represented by Formula III above can be prepared from the corresponding aromatic primary amines by the conventional process of diazotization, using sodium nitrite and hydrochloric acid. A number of primary amines which can be used for this diazotization are described in Sprung U. S. Patent 2,629,659, issued February 24, 1953.

Alternatively, the filter dyes of my invention can be prepared by heating together a compound selected from those represented by Formula II above and a diaryltriazene, such as diphenyltriazene, etc. Useful diaryltriazenes can be prepared according to the method described by Hartman et al. "Org. Syntheses," vol. 14 (1934), page 16.

Filter dyes which have been found to be particularly useful in practicing my invention comprise those represented by the following general formula:

V

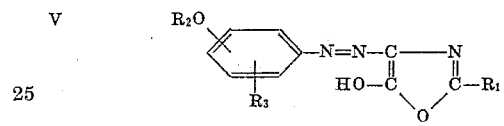

wherein $R_1$ has the values given above, $R_2$ represents an alkyl group containing at least 6 carbon atoms (e. g., hexyl, octyl, decyl, dodecyl, tetradecyl, stearyl, etc.), and $R_3$ represents a carboxyl group, a sulfo group, or alkali metal (e. g., sodium, potassium, etc.) salts of said groups or radicals. The compounds selected from those represented by Formula V above are especially useful because many of these dyes can be dissolved in water and incorporated in the photographic elements of my invention without the use of organic solvents or other more expensive coating procedures.

Where the filter dyes of my invention are water-soluble, they can be incorporated in the photographic layer by simply preparing stock solutions of the dye and adding these stock solutions to an aqueous solution or suspension of the conventional water-permeable colloids employed in photographic coatings, such as gelatin, polyvinyl alcohol, starch, agar agar, gum arabic, etc. Where the filter dye is not soluble in water, it can be dissolved in one of the usual organic solvents, such as pyridine, ethanol, etc., and added to the water-permeable colloid in this condition.

The following examples will serve to illustrate the practice of my invention.

*Example 1.—5-hydroxy-4-phenylazo-2-phenyloxazole*

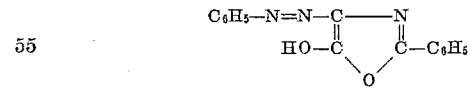

2.0 g. (.011 mole) of hippuric acid and 10.0 g. of acetic anhydride were heated gently until the solid was dissolved. The reaction mixture was cooled to 0° C. and 2.0 g. (.01 mole) of 1,3-diphenyltriazene were added in small portions with stirring. The clear yellow solution was allowed to come to room temperature and to stand for 18 hours. The resulting yellow crystalline precipitate was collected by suction filtration and recrystallized from boiling methanol. The yield of yellow platelets, melting point 202–203° C., was 2 grams, 77 percent of the theoretical quantity, 2.65 grams.

0.3 g. of 5-hydroxy-4-phenylazo-2-phenyloxazole was dissolved in 10 cc. of pyridine. The solution was mixed with 10 cc. of a 10 percent gelatin solution and coated on transparent film. When a strip of this film was immersed in a standard color developer having a pH of about 10.86, the yellow dye was completely bleached in less than one minute.

*Example 2.—4-(3-carboxyphenylazo) - 5 - hydroxy-2-phenyloxazole*

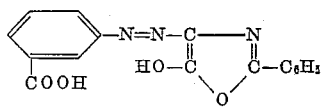

20.0 g. (.11 mole) of hippuric acid and 100 g. of acetic anhydride were warmed together in an Erlenmeyer flask until solution took place. To the clear solution were added 28.5 g. (.10 mole) of di(3-carboxyphenyl)triazene and the mixture was warmed again to solution and allowed to stand at room temperature for 1 to 3 hours. The brownish-yellow precipitate was collected by suction filtration and recrystallized from acetic anhydride. The yield of yellow crystalline powder, melting point 232 to 235° C., was 18.8 g. This was 61 percent of the theoretical quantity of 30.9 g.

1.0 g. of the material obtained above was moistened with a trace of pyridine and dissolved with the aid of heat in 1.0 g. of N,N-diethyllauramide. This solution was poured into a mixture of 20 cc. of a 10 percent gelatin solution and 4 cc. of a 5 percent aqueous ethanol solution. The mixture was milled 4 times and coated on a subbed film base. There resulted a yellow filter layer of $\lambda$ max=424 m$\mu$, which was cleanly bleached in a standard color developer of pH 11.0.

*Example 3.—4-(4-n-dodecyloxy-2-sulfophenylazo)-5-hydroxy-2-phenyloxazole sodium salt*

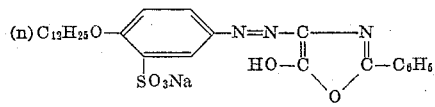

2.96 g. (.0165 mole) of hippuric acid was heated on the steam bath in 7 cc. of acetic anhydride until complete solution had taken place. This took about 30 minutes (see "Jour. Gen. Chem. USSR," vol. 21 (1951), page 167.

5.9 g. (.0165 mole) of sodium-2-amino-5-n-dodecyloxybenzenesulfonate was diazotized in 50 cc. of acetic acid (90 percent) and 5 cc. of concentrated hydrochloric acid by slowly adding 1.6 g. of sodium nitrite in 10 cc. of water. The temperature was kept at 0 to 5° C., and the solution stirred for 1 hour after the addition had been completed. To the diazonium solution were added 2.0 g. of sodium acetate, and the resulting mixture was mixed with the solution obtained above from hippuric acid. To the reaction mixture were added 100 cc. of acetic acid (90 percent) and, after stirring for 1 hour at 10 to 15° C., it was left to stand overnight. The yellow solid that had precipitated was then separated by suction filtration and crystallized from 85 percent acetic acid.

1.0 g. of the 4-(4-n-dodecyloxy-2-sulfophenylazo)-5-hydroxy-2-phenyloxazole obtained above was dissolved in 20 cc. of hot water and poured immediately into 20 cc. of a 10 percent aqueous gelatin solution. The mixture was coated on a subbed film base and dried. There resulted a clear yellow filter layer of $\lambda$ max=446 m$\mu$. It was rapidly and completely decolorized in a standard color developer of about 11.0 pH.

In a manner similar to that illustrated in Example 3 above, a filter coating containing 4-(3-n-dodecyloxy-2-sulfophenylazo)-5-hydroxy-2-phenyloxazole sodium salt was prepared. It was also rapidly and completely decolorized in a standard color developer having a pH of about 11.0.

In a manner similar to that illustrated in the above examples, other filter dyes selected from those represented by Formula I above can be incorporated in photographic elements.

My invention can be further illustrated by reference to the accompanying drawing. As shown therein, Figure 1 is a sectional view of a multi-layer film in which the support 10 of any suitable material, such as cellulose acetate, paper, metal, polyvinyl acetal film, superpolyamide film, etc. is coated with gelatino-silver halide emulsion layers 11, 12 and 13, sensitive to the red, green, and blue regions of the spectrum, respectively. The layer 14 is a gelatin filter layer containing one of the filter dyes of my invention, such as that represented by Example 3 above.

Figure 2 illustrates another modification of my invention in which the support 10 is coated on one side with emulsion layer 16 and on the opposite side with gelatin layer 17 containing one of the filter dyes of my invention, such as the dye set forth in Example 3.

The light-sensitive salts which can be employed in my invention comprise the ordinary gelatino-silver-halide, such as gelatino-silver-chloride, gelatino-silver-bromide, gelatino-silver-chlorobromide, gelatino-silver-bromiodide, gelatino-silver-chloro-bromiodide, etc. The light-sensitive layers can contain the usual sensitizing dyes, such as cyanine, merocyanine, etc., dyes.

While various materials have been previously suggested for use as light-screening filters in photographic elements, no completely satisfactory one has been suggested as yet for this use, although the type of material which has beend found to be most effective, in general, is a filter layer containing colloidal silver, known as "Carey Lea." This silver layer has various disadvantages, the first one being that it has appreciable green absorption, which leads to loss of effective speed in the magenta layer. Under some conditions, the particles of silver also act as nuclei for physical development which leads to deposition of dye in areas where it is not wanted. The filter layers of my invention do not possess any detectable green or red absorption, and they are rapidly and irreversibly bleached under the alkaline conditions used in color development, forming, for example, soluble and innocuous fragments.

Instead of incorporating the oxazolone dyes of my invention in a separate layer as pictured in the appended drawings, the light-screening filters of my invention can be incorporated in one of the light-sensitive layers. The light-screening filter will then be easily removed during the usual photographic processing.

What I claim as my invention and desire secured by Letters Patent of the United States is:

1. A photographic element comprising a light-sensitive silver halide emulsion layer and a light-absorbing, water-permeable colloid layer containing a dye selected from those represented by the following general formula:

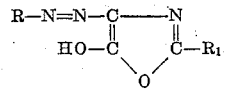

wherein R and $R_1$ each represents a monocyclic aryl group of the benzene series.

2. A photographic element comprising a light-sensitive silver halide emulsion layer and a light-absorbing, water-permeable colloid layer containing a dye selected from those represented by the following general formula:

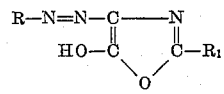

wherein R and $R_1$ each represents a monocyclic aryl group of the benzene series, at least one of said groups having substituted thereon a radical selected from the group consisting of a carboxyl radical, a sulfo radical, and alkali metal salts of said radicals.

3. A photographic element comprising a light-sensitive silver halide emulsion layer and a light-absorbing, water-permeable colloid layer containing a dye selected from those represented by the following general formula:

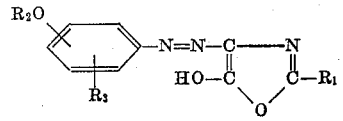

wherein $R_1$ represents a monocyclic aryl group of the benzene series, $R_2$ represents an alkyl group containing from 6 to 16 carbon atoms, and $R_3$ represents a radical selected from the group consisting of a carboxyl radical, a sulfo radical, and alkali metal salts of said radicals.

4. A photographic element comprising a light-sensitive silver halide emulsion layer and a light-absorbing, water-permeable colloid layer containing a dye represented by the following formula:

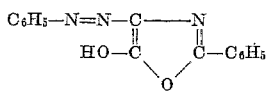

5. A photographic element comprising a light-sensitive silver halide emulsion layer and a light-absorbing, water-permeable colloid layer containing a dye represented by the following formula:

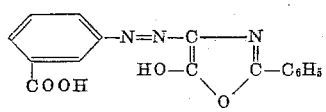

6. A photographic element comprising a light-sensitive silver halide emulsion layer and a light-absorbing, water-permeable colloid layer containing a dye represented by the following formula:

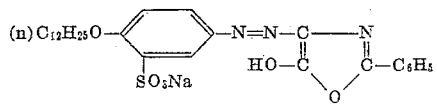

7. A multi-layer photographic element comprising a support having thereon a plurality of differentially sensitive silver halide emulsion layers and between the emulsion layer farthest from said support and an inner emulsion layer, a water-permeable colloid layer containing a dye selected from those represented by the following general formula:

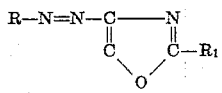

wherein R and $R_1$ each represents a monocyclic aryl group of the benzene series.

8. A multi-layer photographic element comprising a support having thereon a plurality of differentially sensitive silver halide emulsion layers and between the emulsion layer farthest from said support and an inner emulsion layer, a water-permeable colloid layer containing a dye selected from those represented by the following general formula:

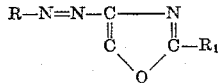

wherein R and $R_1$ each represents a monocyclic aryl group of the benzene series, at least one of said groups having substituted thereon a radical selected from the group consisting of a carboxyl radical, a sulfo radical, and alkali metal salts of said radicals.

9. A multi-layer photographic element comprising a support having thereon a plurality of differentially sensitive silver halide emulsion layers and between the emulsion layer farthest from said support and an inner emulsion layer, a water-permeable colloid layer containing a dye selected from those represented by the following general formula:

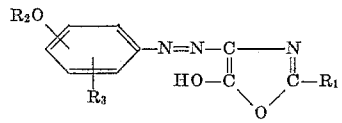

wherein $R_1$ represents a monocyclic aryl group of the benzene series, $R_2$ represents an alkyl group containing from 6 to 16 carbon atoms, and $R_3$ represents a radical selected from the group consisting of a carboxyl radical, a sulfo radical, and alkali metal salts of said radicals.

10. A multi-layer photographic element comprising a support having thereon a plurality of differentially sensitive silver halide emulsion layers and between the emulsion layer farthest from said support and an inner emulsion layer, a water-permeable colloid layer containing a dye selected from those represented by the following formula:

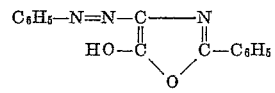

11. A multi-layer photographic element comprising a support having thereon a plurality of differentially sensitive silver-halide emulsion layers and between the emulsion layer farthest from said support and an inner emulsion layer, a water-permeable colloid layer containing a dye selected from those represented by the following formula:

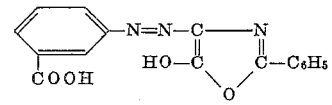

12. A multi-layer photographic element comprising a support having thereon a plurality of differentially sensitive silver-halide emulsion layers and between the emulsion layer farthest from said support and an inner emulsion layer, a water-permeable colloid layer containing a dye selected from those represented by the following formula:

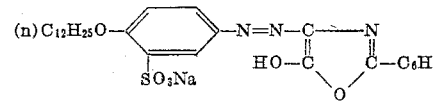

References Cited in the file of this patent

UNITED STATES PATENTS

| | | |
|---|---|---|
| 2,390,707 | Heimbach | Dec. 11, 1945 |
| 2,432,419 | Heimbach | Dec. 9, 1947 |
| 2,503,717 | Fierke et al. | Apr. 11, 1950 |
| 2,632,004 | Minsk et al. | Mar. 17, 1953 |

FOREIGN PATENTS

| | | |
|---|---|---|
| 599,623 | Great Britain | Mar. 17, 1948 |

UNITED STATES PATENT OFFICE
Certificate of Correction

Patent No. 2,852,376            September 16, 1958

George W. Sawdey

It is hereby certified that error appears in the printed specification of the above numbered patent requiring correction and that the said Letters Patent should read as corrected below.

Column 8, lines 47 to 52, the right-hand portion of the formula should appear as shown below instead of as in the patent—

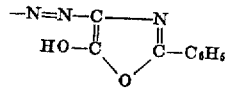

Signed and sealed this 2nd day of December 1958.

[SEAL]

Attest:
KARL H. AXLINE,
*Attesting Officer.*

ROBERT C. WATSON,
*Commissioner of Patents.*